Feb. 23, 1971    K. NASSAU ET AL    3,565,577
METHOD FOR PRODUCING POTASSIUM NIOBATE CRYSTALS
Filed March 29, 1968

INVENTORS: K. NASSAU
J. F. PULUKA
J. W. SHIEVER

BY *George S. Indig*

ATTORNEY

United States Patent Office

3,565,577
Patented Feb. 23, 1971

3,565,577
METHOD FOR PRODUCING POTASSIUM NIOBATE CRYSTALS
Kurt Nassau, Bernardsville, John F. Puluka, Somerville, and John W. Shiever, Berkeley Heights, N.J., assignors to Bell Telephone Laboratories, Incorporated, Murray Hill and Berkeley Heights, N.J., a corporation of New York
Filed Mar. 29, 1968, Ser. No. 717,219
Int. Cl. C01g 33/00
U.S. Cl. 23—20                                          6 Claims

ABSTRACT OF THE DISCLOSURE

Single crystals of $KNb_3O_8$ have been obtained from a melt containing an excess of $K_2O$ over the stoichiometric amount. Such crystals exhibit excellent cleavage, flexibility, and dielectric properties which enable their use in high frequency, high voltage, high capacitance applications. Such crystals are also transparent to electromagnetic radiation within the visible and portions of the ultraviolet and infrared spectrums, and exhibit a high refractive index enabling their use as light guides.

BACKGROUND OF THE INVENTION (1) Field of the invention

This invention relates to a method for growing crystalline potassium niobate ($KNb_3O_8$), to the resulting product and to devices utilizing same.

(2) Prior art

Among the most excellent of the naturally occurring dielectric materials are the micas. Such materials exhibit high chemical and electrical stability and low dielectric loss. The electrical stability of mica is exemplified by its high dielectric strength at high frequencies and high voltages.

Because of this characteristic, micas are the most commonly used materials for high voltage, high frequency applications, where layers of thin sheets of dielectric material must be formed in order to obtain required high capacitances. Typical properties of a good grade of mica are a dielectric constant of about 7.5 and a loss factor of about .0002 at a frequency of $10^6$ Hz., and a dielectric breakdown strength of from 3 to 6 kilovolts per mil thickness.

The strategic importance of natural mica is well attested by prolonged efforts to find efficient processes for its synthesis. Extensive work at the Bureau of Mines has yielded a satisfactory process for small size material. See R. A. Hatch et al., Synthetic Mica Investigations, IX, Bureau of Mines Report of Investigations #5337, June 1957, and H. R. Shell, "Micas, Natural and Synthetic," Kirt-Othmer Encyclopedia of Chemical Technology, Interscience Pub., New York, 2nd ed., 1967, vol. 13, pp. 398–424. High pressure techniques have also been described, for example, in U.S. Pat. 3,334,972, issued Aug. 8, 1967 to Leven et al. However, synthetic mica is not yet suitable as a substitute for strategic natural mica because of the lack of a practical process for obtaining crystals larger than one inch in size.

It has been reported that crystals of compounds of $K_2O:3Nb_2O_5$ and $2K_2O:3Nb_2O_5$ exhibit birefringence and that crystals of the 2:3 compound are similar to mica in appearance, having a lamellar type of growth. Since the 2:3 compound readily absorbs water from the atmosphere with attendant deterioration of the electric properties, its use as a mica substitute is not promising.

SUMMARY OF THE INVENTION

In accordance with this invention, it has been discovered that single crystals of $KNb_3O_8$, corresponding to an oxide ratio of ($K_2O:3Nb_2O_5$) may be obtained from a melt containing an excess of potassium oxide over the stoichiometric amount, and that such crystals exhibit excellent cleavage and flexibility, and good electrical properties suggesting use as a mica substitute, exemplified by a dielectric constant of about 9.5 in the region $10^3$ to $6 \times 10_6$ Hz., a loss factor of about .0003 at $10_6$ Hz., a dielectric breakdown strength of about 3 kilovolts per mil, and a temperature coefficient of capacitance within the range of $-55°$ C. to $200°$ C. of 150 p.p.m. per $°$ C.

The resultant crystals also transmit electromagnetic radiation having wavelengths of from about .35 to 5 microns, and exhibit a refractive index of about 2. Device uses which take advantage of the crystals' dielectric and optical properties are contemplated.

DETAILED DESCRIPTION

Starting materials may be compounds or mixtures of elements capable of producing a melt of desired oxide composition, such as potassium carbonate or oxalate and niobium oxide. Where starting materials such as carbonates decompose upon heating into the oxide and a gaseous product, it will usually be convenient to presinter the starting materials in order to prevent excessive bubbling and possible spattering of the melt. Alternatively, spattering may be avoided by a relatively slow preheat. The melt must contain an excess of from 0.1 to 40 percent by weight of potassium oxide over the stoichiometric ratio of 1 to 3 of potassium atoms to niobium atoms, both as oxides. The presence of amounts outside this range will prevent the obtaining of single crystals of $KNb_3O_8$. An excess of from 1% to 10% is preferred, below which the melt composition is difficult to control and above which little advantage is gained to insure that an excess of $K_2O$ is present.

It will be appreciated that as growth proceeds, the excess of $K_2O$ will increase, so that it may be desirable to use a starting composition corresponding to only a slight excess, for example, from 1% to 2%, so that substantial growth may be achieved before the upper limit is exceeded.

In addition to the melt addition specified above, essential to this invention, it is desirable to follow the practices which have been found useful in the various seeded growth techniques. For example, it is desirable to minimize the number of defects in a seed, although in this connection it is found that defect-free interfacial material perpetuates itself in the growing crystal and so results in a larger defect-free region. In common with other crystal-growing techniques, adequate mixing, controlled temperature gradients, reasonably slow rate of growth, etc., are all conducive to a more nearly perfect crystalline end product.

Figure 1:
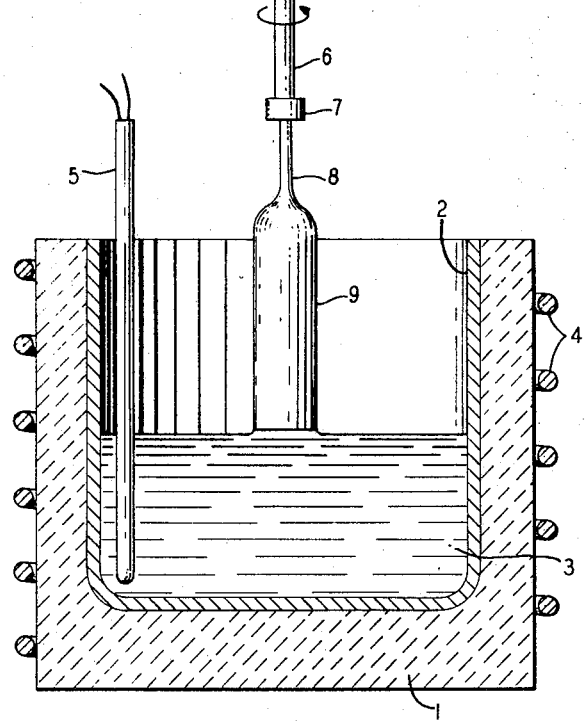
FIG. 1 is a front elevational view, partly in section, depicting an apparatus illustrative of many techniques which may be utilized for obtaining crystalline materials from the melt.

Referring now in detail to FIG. 1, the apparatus depicted in the figure is useful for practicing Czochralski growth and includes a crucible support 1, which in this instance is constructed of alumina and so performs the additional function of thermally insulating the inner crucible 2 which is constructed of a precious metal such as platinum and which in turn contains melt 3 which as has been noted is composed of a near stoichiometric mixture of potassium niobate, to which has been added an excess of potassium oxide.

In general, the normally encountered impurities, or even deliberately added impurities such as barium, titanium, tantalum, vanadium, tungsten and molybdenum in amounts of less than 1% total have little effect on the properties of the end product, thus indicating that highest purity starting materials are not required. However, depending on the end uses to which the crystal is to be put, it may be desirable to exclude to a large extent most or all impurities. For more sophisticated device uses, it would be preferred to maintain impurities below a level of about 1000 p.p.m.

Melt 3 is rendered and maintained molten by means of a heating source 4, here illustratively depicted as R.F. heating coils. In keeping with usual good crystal growing practice for the technique illustrated, it is desirable to maintain the melt at a near constant temperature (in this instance at a temperature of from about 1130° to about 1250° C. is required to render the melt molten, the lower temperatures corresponding to greater amounts of excess potassium oxide). To this end the depicted apparatus is provided with a thermocouple sensing means 5. The apparatus is provided also with a spindle 6, which is slowly raised and preferably rotated by means not shown, such spindle being provided with chuck 7, holding a seed crystal 8, upon which there has been solidified grown crystal 9 at the stage of operation at which the apparatus is depicted. The orientation of seed 8 is not critical, any growing direction being feasible. However, a growing direction perpendicular to the cleavage plane is difficult due to the lamellar nature of the crystallized product and the ease of separation of the lamellae. A growing direction parallel or near parallel to the cleavage plane is preferred, especially where large size crystals are desired.

The pulling mechanism, not depicted in the figure, should be such as to permit growth at a rate of three inches per hour or less. Consistent with common experience in crystal pulling, crystal perfection is improved by still slower rates (down to the order of $\frac{1}{10}$ inch per hour), at least during the bulk growth at which full diameter has been attained. A growth rate of from ½ to ¾ inch per hour is preferred, below which the time required for crystals of substantial size is commercially expedient and improvement in crystal perfection is negligible, and above which it is difficult to maintain a high degree of crystal perfection. Rotation of the crystal or of the crucible relative to the crystal, minimizes the effect of any temperature gradients about the periphery of the crystal and serves also to stir the melt. If such rotation is to be useful, it is desirable that it be at a rate of at least 5 r.p.m.

The crystal pulling apparatus depicted in the figure should be understood as being exemplary. The advantages of the invention obtain for any other crystal growing technique in which crystallization proceeds from the melt upon an oriented seed. In most instances, it is preferable that any such technique make use of a separately inserted seed, whether the apparatus be designed for Czochralski, Bridgeman-Stockbarger, Verneuil or Stoëber growth, or for zone melting. It is possible, however, by variation of the Bridgeman-Stockbarger technique to initially grow an oriented seed by appropriate shaping of the cavity portion in which nucleation occurs, so as to produce the appropriate orientation. Such is to be considered a variation of seeded growth for the purpose of this description.

As-grown crystals are colorless and transparent, and show a pronounced cleavage. By the use of suitable techniques it is possible to obtain sheets down to 1 micron in thickness.

Crystals up to ⅞ inch in diameter and 4 inches in length have been produced by the Czochralski technique using a crucible having a diameter of 1½ inches. As is known, larger sized crystals may be obtained using a larger sized crucible by this technique.

Figure 2:
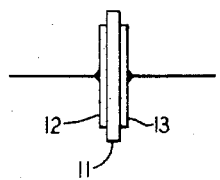
FIG. 2 is a cross-section view of a device utilizing the dielectric properties of the material of the invention.

Referring now to FIG. 2, there is depicted a cross-section in a plane perpendicular to the crystal cleavage of a device comprising a cleaved sheet of dielectric crystalline body 11 obtained by the inventive method and electrodes 12 and 13, each attached to a cleavage face thereof, across which electrodes an electric field source for applying electrical energy is introduced, and which also serve as a means for removing the stored energy.

Of course, the specific description of FIG. 2 is to be considered but illustrative. For example, some other device embodiments include a dielectric body composed of alternating layers of the inventive material and conductive material. Such a body may be in the form of a rectangular plate, or may be shaped so as to result in a more compact device, enabled by the excellent flexibility of thin sheets of the inventive material.

Figure 3:
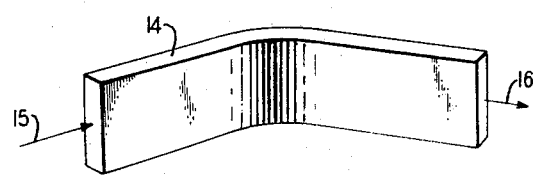
FIG. 3 is a perspective view of a device utilizing the optical properties of the material of the invention.

Referring now to FIG. 3, the device depicted may serve as one form of a light guide, comprising crystalline body 14 obtained by the inventive method. An incident beam 15 enters parallel to a cleavage face and is acted upon by body 14 so as to result in exiting beam 16.

Other embodiments of the device of FIG. 3 will be appreciated by those skilled in the art.

Example 1

Starting materials comprising 13.82 grams of potassium carbonate ($K_2CO_3$) and 79.74 grams of niobium oxide ($Nb_2O_5$) were mixed together and ball milled to effect an intimate mixture. The mixture was furnace heated overnight at 650° C., reground and reheated overnight at 850° C. The mixture was transferred to a platinum crucible 1¾ inches in diameter by 1½ inches deep and about one millimeter thick, and placed within the coil of an R.F. generator and heated to a temperature of about 1275°±25° C. Additional starting material was prepared and melted until the crucible was about half full. Total starting material then corresponded to about twice the amount of initial ingredients stated above. An amount of potassium carbonate equivalent to 2 grams per 100 grams of starting material was then added, which corresponded to about 1¾ weight percent of potassium oxide over the stoichiometric oxide composition. The temperature of the melt was then lowered to just above its melting point of about 1230° C. A seed crystal oriented so as to promote crystal growth in the cleavage plane along the optic normal direction was inserted into the surface of the melt and rotated at about 100 r.p.m. while simultaneously being pulled from the melt so that a growth rate of about one-half inch per hour resulted. Crystals have been grown up to four inches in length and up to ¾ inch in diameter without difficulty so that longer crystals are expected to be easily obtainable.

Example 2

The procedure of Example 1 was followed except that an amount of potassium carbonate equivalent to one gram per 100 grams of starting material was added.

Example 3

The procedure of Example 1 was followed except that an amount of potassium carbonate equivalent to three grams per 100 grams of starting material was added.

Example 4

The procedure of Example 1 was followed except that a platinum wire was inserted into the melt and slowly withdrawn so as to obtain a seed crystal. The seed crystal was then used as in Example 1 to promote further growth.

Example 5

The procedure of Example 1 was followed except that the seed crystal was pulled from the melt so that a growth rate of ¼ inch per hour resulted.

Example 6

The procedure of Example 1 was followed except that the seed crystal was pulled from the melt so that a growth rate of two inches per hour resulted.

Example 7

The procedure of Example 1 was followed except that the seed crystal was oriented so as to achieve growth along the acute optic bisectrix. Considerable difficulty was experienced in obtaining satisfactory crystals.

Example 8

The procedure of Example 1 was followed except that the seed crystal was oriented so as to achieve growth along the obtuse optic bisectrix.

Example 9

The procedure of Example 1 was followed except that the seed crystal was oriented so as to achieve growth approximately half way between the optic normal and the obtuse optic bisectrix.

Example 10

The procedure of Example 1 was followed except that the seed crystal was oriented so as to achieve growth about 30° from the cleavage plane. Some difficulty was experienced in obtaining satisfactory crystals.

Example 11

The procedure of Example 1 was followed except that the following impurities were added per 100 grams of starting material: vanadium oxide ($V_2O_5$) in the amount of .27 gram and tantalum oxide ($Ta_2O_5$) in the amount of .66 gram.

Example 12

The procedure of Example 1 was followed except that the following impurities were added per 100 grams of starting material: Tungsten oxide ($WO_3$) in the amount of .85 gram and molybdenum oxide ($MoO_3$) in the amount of .85 gram.

Example 13

The procedure of Example 1 was repeated except that the following impurities were added per 100 grams of starting material: barium carbonate ($BaCO_3$) in the amount of .84 gram and titanium oxide ($TiO_2$) in the amount of .34 gram.

These examples have been included to illustrate the various parameters which permit the achieving of satisfactory potassium niobate crystals. Except as noted, good quality and large sized crystals were obtained for each of the described procedures.

Example 14

Starting materials prepared in accordance with the procedure described in Example 1 were transferred to a platinum crucible 3½ inches long having a maximum diameter of one inch and tapered to a point at the bottom, thus corresponding to a shape suitable for practice of the Bridgeman-Stockbarger technique (sometimes also termed the Bridgeman technique or the Stockbarger technique). The crucible was placed in the upper part of the furnace of a Bridgeman-Stockbarger type apparatus and lowered at the rate of one inch per day for five and one-half days. The temperatures at the top and bottom of the crucible were 1355° and 1295° C. at the beginning and 1121° and 685° C. at the end of the growth period respectively.

Good quality potassium niobate crystals up to ⅜ inch in size were obtained.

This example has been included to show the feasibility of obtaining suitable single crystals of the inventive material by methods other than Czochralski growth. It will be appreciated, however, that Czochralski growth exhibits certain advantages over other methods including a rapid growth rate, minimization of strain in or contamination of the crystal and ability to observe growth as it proceeds. The Bridgeman-Stockbarger technique may, however, be the preferred technique for the routine commercial production of large amounts of large sheets of the single crystals.

Example 15

A crystal of the inventive method was subjected to electron bombardment of sufficient quantity to seriously deteriorate the electrical properties of plastic materials. A slight deterioration of the loss factor at $10^6$ Hz. was observed, changing from 0.0003 to 0.003 after an exposure to 20 mega rads of 1 mev. electrons.

The invention has been described with reference to particular embodiments but it is to be understood as encompassing embodiments which do not depart from the scope and spirit thereof as set forth in the description and the accompanying claims.

What is claimed is:

1. A method for producing single crystals of potassium niobate comprising forming a mixture of initial ingredients equivalent to $KNb_3O_8$ together with material which produces excess $K_2O$ during said method, said excess $K_2O$ being present in the amount of from 0.1 percent to 40 percent by weight, heating said ingredients to a temperature sufficient to form a molten mass, providing a seed crystal within said mass, and crystallizing material on the seed so produced.

2. The method of claim 1 in which potassium oxide is present in an amount of from 1% to 10% by weight.

3. The method of claim 1 in which the seed crystal is provided within said mass by growth outside the mass followed by insertion into the mass.

4. The method of claim 3 in which the seed crystal is withdrawn so as to obtain a crystal growth rate of from one-tenth to three inches per hour.

5. The method of claim 4 in which the growth rate is from one-half to three-quarters inch per hour.

6. The method of claim 1 in which the seed crystal is provided within said mass by growth within said mass.

References Cited

UNITED STATES PATENTS 2,758,008   8/1956   Reisman et al.   23—51

OTHER REFERENCES

Guerchais, "Societe Chimique de France (Bulletin)," January 1962, pp. 103–107.

Reisman et al., "Journal of the American Society," vol. 77, April 1955, pp. 2115–2119.

Voskresenskaya et al., "Akademüa Nauk. SSSR Dohlady," September 1966, pp. 329–331.

Wainer et al., "Journal of the American Ceramic Society," vol. 35, August 1952, pp. 207–214.

HERBERT T. CARTER, Primary Examiner

U.S. Cl. X.R.

23—51